July 26, 1932. M. HINES 1,869,256
COMBINATION FLYING MACHINE AND AIRSHIP
Filed April 24, 1931 3 Sheets-Sheet 3
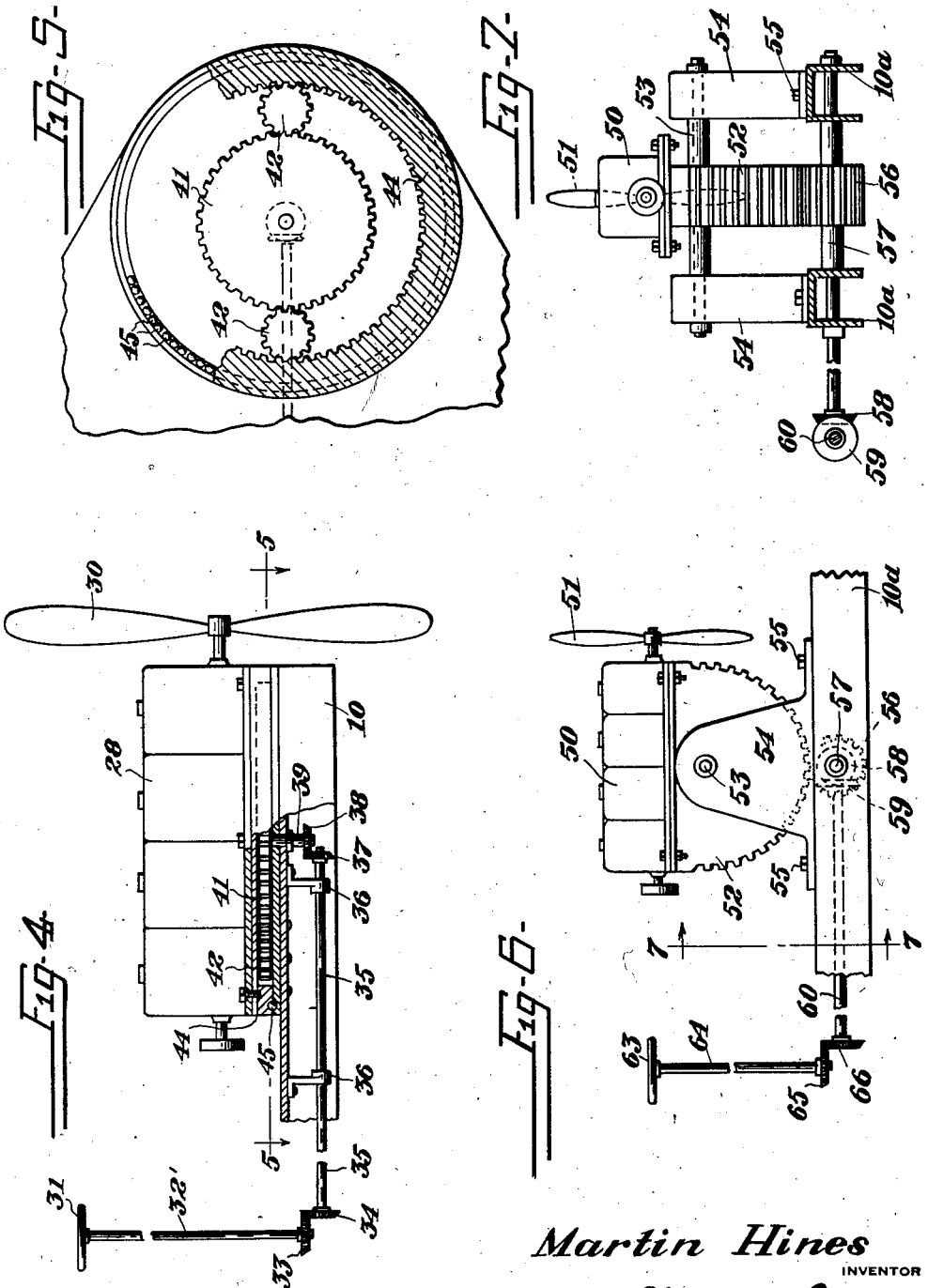
Martin Hines
INVENTOR
BY Victor J. Evans
ATTORNEY Patented July 26, 1932

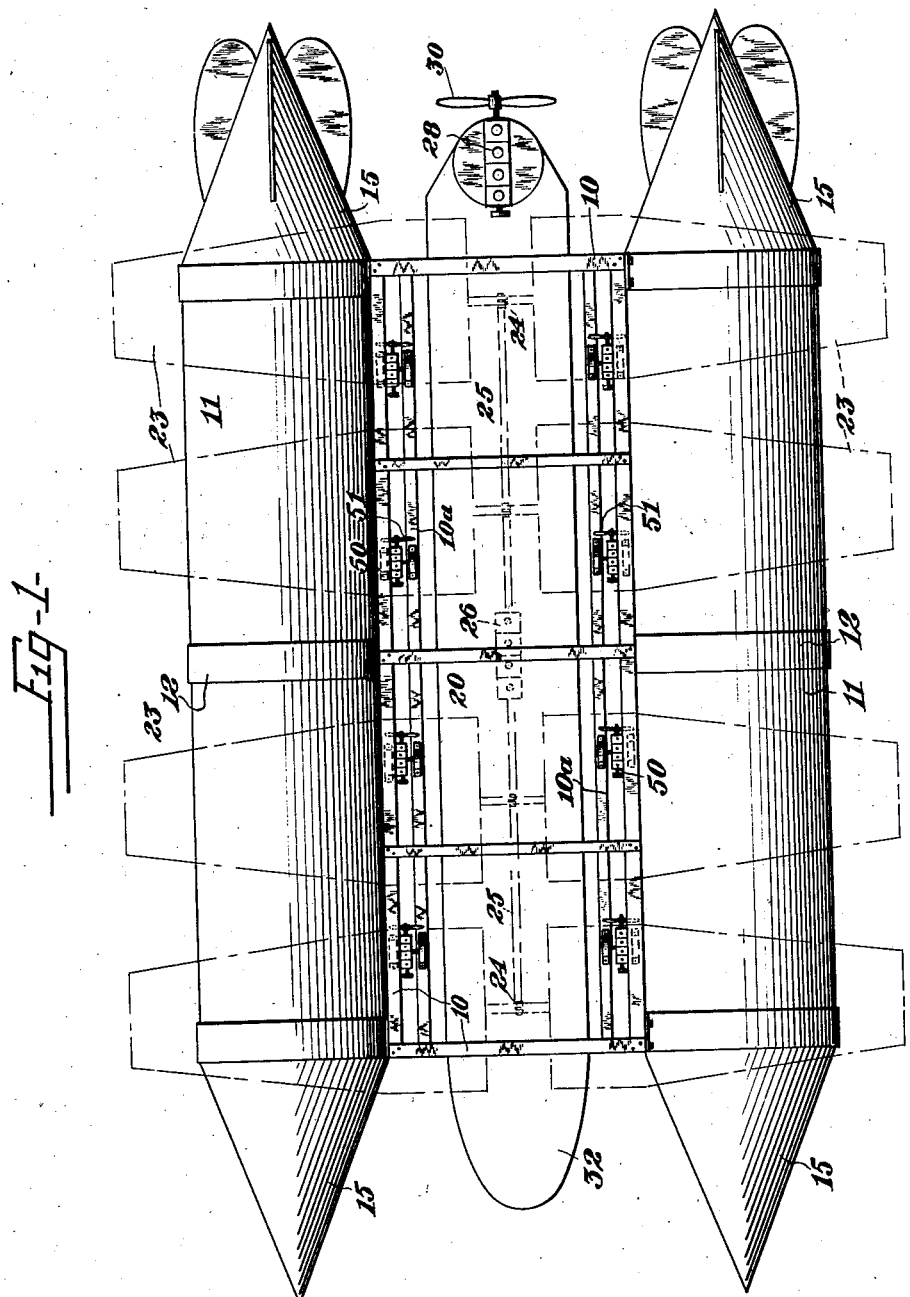

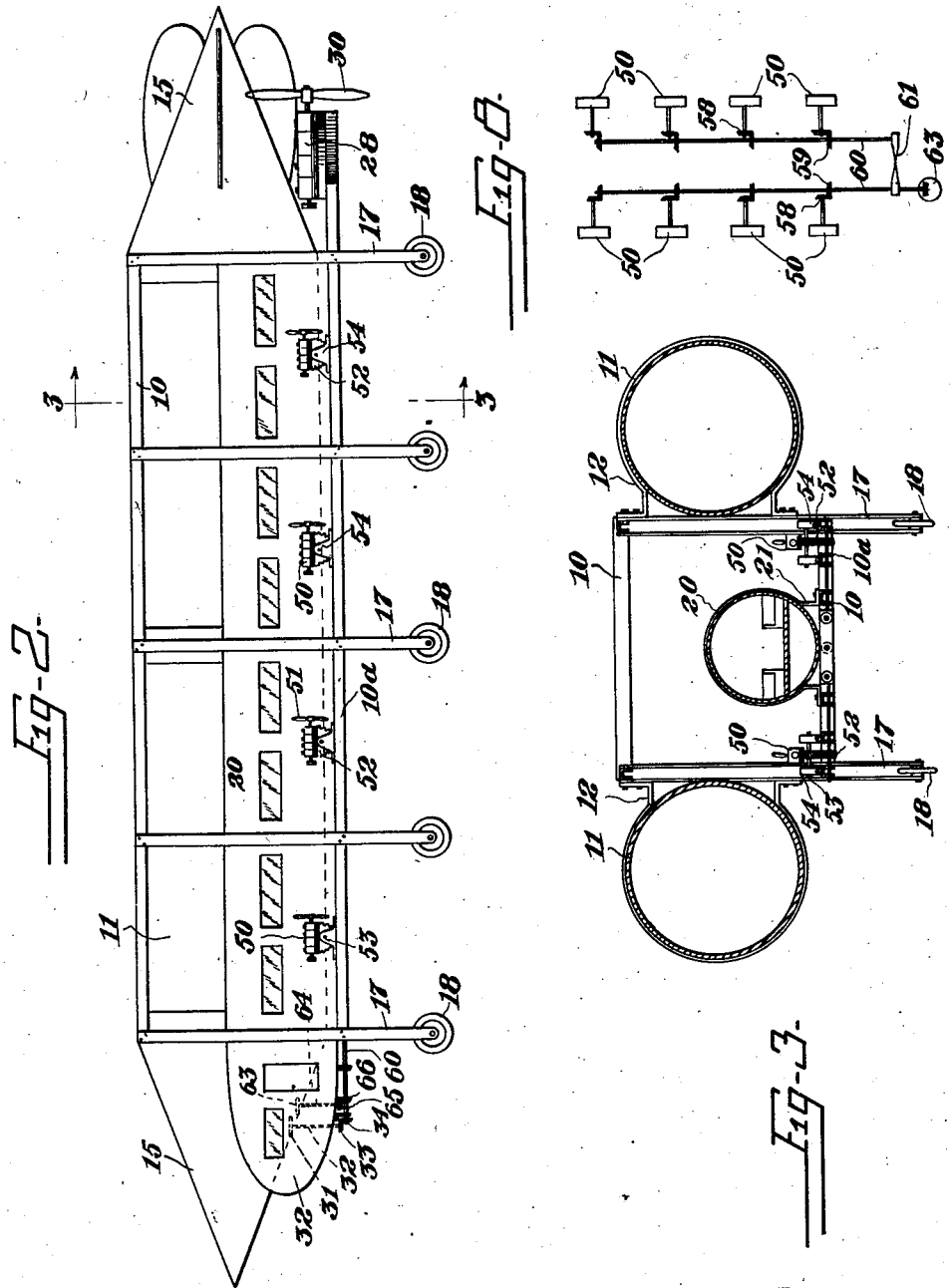

1,869,256

UNITED STATES PATENT OFFICE

MARTIN HINES, OF BROOKLYN, NEW YORK, ASSIGNOR OF ONE-FOURTH TO MICHAEL J. WARD, ONE-FOURTH TO ALBERT F. PURSER AND ONE-FOURTH TO MARGARET E. HINES, ALL OF BROOKLYN, NEW YORK

COMBINATION FLYING MACHINE AND AIRSHIP

Application filed April 24, 1931. Serial No. 532,595.

This invention relates to aircraft and more particularly to a combination flying machine and airship.

An object of the invention is the provision of a propeller adapted to function as a rudder also.

Another object of the invention is the provision of motors individually mounted for movement in a vertical plane for the purpose of raising and lowering the aircraft.

Other objects will be appreciated from reading the following specification.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Fig. 1 is a plan view of the aircraft of my invention.

Fig. 2 is a side view.

Fig. 3 is a vertical section taken on line 3—3 of Fig. 2.

Fig. 4 is an elevational view of a motor partly broken away and partly in section for turning a propeller and mounted for turning movement and means for turning the motor.

Fig. 5 is a horizontal section taken on line 5—5 of Fig. 4.

Fig. 6 is a side view of a motor mounted for movement in a vertical plane and means for moving the motor and a propeller attached thereto.

Fig. 7 is a view taken on line 7—7 of Fig. 6; and

Fig. 8 is a plan view of motors mounted for movement in a vertical plane and means for moving the motors simultaneously.

Referring to the drawings for a more detailed description thereof, the numeral 10 indicates the frame of the aircraft, to the sides of which are secured gas bags 11 by means of brackets 12. The gas bags 11 are conical at their front and rear ends as indicated by the numeral 15. The aircraft is provided with legs 17 carrying wheels 18. A body 20 is mounted in the frame 10 and is secured thereto by means of angles 21. The air craft may if desired be equipped with flapping wings 23, these wings being adapted to be operated in pairs, each pair being connected at the point 24. The wings are adapted to be operated by shafts 25 driven by a motor 26 shown in Fig. 1. The construction of the wings and their connections to each other and to the motor are shown in detail in my Patent No. 1,276,760, issued August 27, 1918. The wings 23 may be used or not if desired. When provided on the aircraft they may be employed in an emergency overload.

In Figs. 1, 2 and 4 a motor 28 is mounted for turning movement in a horizontal plane, this motor carrying a propeller 30 adapted to be rotated by the motor. The motor 28 is adapted to be turned by a hand wheel 31 positioned in the cabinet or pilot house 32 in the body 20 as shown in Fig. 2. The hand wheel 31 is secured to a rod 32' having a beveled gear 33 mounted on the bottom thereof. The beveled gear 33 engages the beveled gear 34 which is mounted on one end of a shaft 35 carried in brackets 36. Beveled gear 37 is mounted on the other end of the shaft 35 and engages a beveled gear 38 mounted on an end of a shaft 39, the other end of which is secured to a gear 41 clearly shown in Fig. 5. The gear 41 engages idler pinions 42 which engage an internal gear 44 mounted on ball bearings 45. It will be readily seen that the turning of the wheel 31 is effective to turn the internal gear 44 and therefore to turn the motor 28 mounted thereon. The turning of the motor 28 to different positions in a horizontal plane causes the propeller 30 to act as a rudder as will readily be appreciated.

In order to raise and lower the aircraft I provide a plurality of motors 50 shown in Figs. 1 and 8 as being arranged in two parallel rows. Each of these motors is mounted for turning movement in a vertical plane and means are provided for turning all these motors simultaneously.

Each motor 50 is adapted to rotate a propeller 51 and each motor is mounted on a vertically disposed gear 52 mounted on a shaft 53 which is journaled in standards 54 secured by means of bolts 55 to frame members 10a. Each gear 52 engages a pinion 56 mounted on a shaft 57 which is held in the frame members 10a. Each shaft 57 has a beveled gear 58 mounted on one end thereof and engages a gear 59 mounted on a shaft 60. The two shafts 60 are connected by a cross belt 61 as shown in Fig. 8 so that they may be driven in opposite directions and turned simultaneously. In order to turn the two shafts 60 together in opposite directions a hand wheel 63 shown in Fig. 6 is provided. The hand wheel 63 is secured to a rod 64, on the bottom of which is mounted a beveled gear 65 which engages a beveled gear 66 mounted on one of the shafts 60. It is apparent that the turning of the hand wheel 63 is effective to turn the gears 59 and thereby turn the gears 58 which turn the shafts 57 and the pinions 56 mounted thereon. The turning of the pinions 56 turns the gears 52 and the motors 50 simultaneously in vertical planes. When it is desired to turn the air craft in a horizontal plane for example, one row of motors 50 is permitted to run idle so that the operation of the other row of motors will be effective to turn the aircraft.

What I claim as new is:

1. An airship comprising a body, shafts extending longitudinally of the body on opposite sides, a plurality of standards arranged in pairs with the pairs disposed at uniformly spaced distances along the body and on opposite sides thereof, a semi-circular gear mounted between and journalled in the units of each pair of standards, a propeller carrying motor mounted on the flat side of each semi-circular gear, pinions in mesh with the gears, transverse shafts on which said pinions are carried, operative connections between the transverse shafts and the first said shafts and a cross belt connecting both of the first said shafts to provide for synchronous movement of all of the shafts to swing the semi-circular gears and tilt the propeller ends of the motors up or down but at corresponding angles.

2. An airship comprising a body, shafts extending longitudinally of the body on opposite sides, a plurality of standards arranged in pairs with the pairs disposed at spaced distances along the body and on the opposite sides thereof, a semi-circular gear mounted between the units of each pair of standards and journalled at its center in said standard with the flat side disposed upwardly, a propeller carrying motor mounted on the flat side of each semi-circular gear, pinions in mesh with the gears, transverse shafts on which said pinions are carried, operative connections between the transverse shafts and the first said shafts and a cross belt connecting both of the first said shafts to provide for synchronous movement of all of the shafts to swing the semi-circular gears and tilt the propeller ends of the motors up or down but at corresponding angles.

3. An airship comprising a body, shafts extending longitudinally of the body on opposite sides, a plurality of standards arranged in pairs with the pairs disposed at spaced distances along the body and on the opposite sides thereof, a semi-circular gear mounted between the units of each pair of standards and journalled at its center in said standard with the flat side disposed upwardly, a propeller carrying motor mounted on the flat side of each semi-circular gear, pinions in mesh with the gears, transverse shafts on which said pinions are carried, operative connections between the transverse shafts and the first said shafts and a cross belt connecting both of the first said shafts to provide for synchronous movement of all of the shafts to swing the semi-circular gears and tilt the propeller ends of the motors up or down but at corresponding angles, the pinions being disposed below the semi-circular gears and each having its axis disposed in the same vertical plane as the axis of the associated gear.

In testimony whereof I hereby affix my signature.

MARTIN HINES.